United States Patent Office

3,041,172
Patented June 26, 1962

3,041,172
PHOTOPOLYMERIZATION OF VINYL MONOMERS WITH METAL OXIDES AS CATALYSTS
Helene D. Evans, Endwell, Fritz W. H. Mueller, Binghamton, and Steven Levinos, Vestal, N.Y., assignors to General Aniline & Film Corporation, New York, N.Y., a corporation of Delaware
No Drawing. Filed Dec. 30, 1958, Ser. No. 783,725
13 Claims. (Cl. 96—115)

The present invention relates to the formation of hard solid polymers by photopolymerizing or copolymerizing normally liquid or solid monomeric vinyl compounds while employing as the catalysts for photopolymerization a metal oxide such as zinc oxide or titanium dioxide or such oxides the catalytic effect of which is promoted by a heavy metal salt, a sensitizing organic dye or an oxidizable organic compound and to light-sensitive materials containing such monomer and catalyst in a colloidal carrier.

Application Serial No. 715,528, filed February 15, 1958 by Steven Levinos discloses that monomeric compounds containing a vinyl group can be photopolymerized by radiations having a wave length from $10^{-1}$ to $10^{-10}$ centimeters to yield solid products while employing as the catalyst radiation-sensitive silver compounds.

Application Serial No. 731,538 by Steven Levinos and Fritz W. H. Mueller suggests that the catalysts for such photopolymerization be light-sensitive silver halide emulsions, whereas application Serial No. 765,275 by the same parties proposes the use as catalysts for such photopolymerization of light-sensitive silver compounds promoted by amphoteric metal oxides.

It has now been discovered that normally liquid to solid vinyl monomers may be photopolymerized in bulk or in coated dry layers with U.V. light or light of the visible spectrum while employing as the catalyst zinc oxide or titanium dioxide alone or such oxides the catalytic activity of which is promoted by a heavy metal salt other than silver or by an oxidizable organic compound or by a sensitizing organic dye. Such method of photopolymerization and light-sensitive materials comprising a base coated with a vinyl monomer, the aforestated catalyst and a colloidal carrier constitute the purposes and objects of the present invention.

The exact mechanism according to which these catalysts induce photopolymerization in bulk or when suitably coated and dried on supports such as metal, paper, glass, film or the like is not completely understood but it is assumed that it involves free radicals in one form or another. Redox reactions do occur in ultraviolet light- or visible light irradiated suspensions of zinc oxide or titanium dioxide. Since certain redox reactions can cause photopolymerization of vinyl compounds, it is plausible to explain the conversion of light energy into chemical energy in this manner in view of the fact that we have observed that a trace of moisture is essential to promote photopolymerization. In any case, when zinc oxide or titanium dioxide dispersions alone or in combination with the aforesaid promoters in suitable matrices containing a vinyl monomer are coated on suitable supports and exposed under a negative or stencil, imagewise photopolymerization of the vinyl monomer ensues in such a manner that a sharp photoresist remains after the unpolymerized, unexposed areas are removed by washing. Similarly, vinyl monomers in the presence of water and such metal oxide catalysts are photopolymerized in bulk to hard solid monomers in short periods of time when irradiated with U.V. or visible light. Imagewise photopolymerization involving the aforesaid catalysts is useful in the preparation of photolithographic printing plates, rotogravure cylinders, printed circuits, preparation of microfilm and other print materials comparable to silver halide photographic paper and image transfer papers.

It has been explained that zinc oxide or titanium dioxide are per se capable of photopolymerizing vinyl monomers when irradiated with U.V. or visible light. It may be noted, in this connection, that very good results are obtained when using as the titanium dioxide the product precipitated from titanium tetraethylate according to the procedure of H. Knoll et al., "Naturwissenschaften," vol. 45, No. 11, page 262, 1958 and the examples should be construed in this light.

The catalytic activity of the zinc oxide or titanium dioxide, however, is greatly promoted when they are used in combination either for bulk photopolymerization or for imagewise photopolymerization with heavy metal salts or with oxidizable organic compounds or with sensitizing organic dyestuffs.

The heavy metal salts contemplated for use for promotion of the catalytic effect of the zinc oxide or titanium dioxide are those of thallium, mercury or iron. The salts may be inorganic acid salts such as thallous sulfate, thallous nitrate, thallous phosphate or the like, ferric chloride, ferric sulfate or the like, mercuric chloride, mercuric sulfate or the like or salts of organic acids such as thallous formate, thallous oxalate, thallous butyrate, thallous acetate or the like, ferric oxalate, ferric formate, ferric propionate, ferric acetate or the like, mercuric formate, mercuric oxalate, mercuric acetate or the like. It has been established that the heavy metal ion is more effective when used in the form of the organic salts and, hence, we prefer to use this form of the salt.

Oxidizable organic materials also operate to greatly promote the catalytic effect of the zinc oxide or titanium dioxide in our photopolymerization procedure. Examples of the oxidizable organic compounds found to be suitable for our purposes are the carboxylic acids such as formic acid, acetic acid, propionic acid, oxalic acid or the like, the salts of such acids such as sodium or potassium formate, sodium or potassium oxalate or the like; phenols such as phenol, cresol, naphthol or the like, aromatic hydrocarbons such as toluene, ethyl benzene or the like, amides such as methylacetamidobenzene, benzoylaminobenzene or the like or aldehydes such as acetaldehyde, benzaldehyde or the like.

It is known that certain oxides such as zinc oxide or lead oxide can be optically sensitized with small quantities of organic dyes. In our work, we discovered that the ability of zinc oxide and titanium dioxide to catalyze the photopolymerization of vinyl monomers is greatly promoted by the use of such dyes as amino fluorimes, hydroxy fluorimes and hydroxy fluorones in which the unsaturated carbon atom linking the two benzo rings is substituted by a phenyl radical and thiazines. Examples of such compounds are eosin, fluorescin, erythrosin, Rose Bengal, rhodamine B, methylene blue or the like. This optical sensitization through organic dyes, which is analogous to optical sensitization of silver halides, is distinctly different from the photoreduction described in the prior art as will be subsequently explained.

The quantity of metal oxide used in the photopolymerization may range from about 1% to 200% by weight of the monomer employed. Larger amounts may, of course, be used but no improvement in result follows from the larger amount. As a matter of fact, in bulk photopolymerization, excesses of metal oxides will settle out from a water solution of the components and, therefore, such excesses should be avoided.

The quantity of the promoter as compared to the metal oxide covers a broad range. Thus, we have used as little as .0005 g. of the promoter per gram of oxide and as much as .65 g. of the promoter per gram of oxide. In each case, effective photopolymerization to hard solid polymers was realized.

Any normally liquid to solid monomeric compound containing the grouping $CH_2=C=$, or mixtures thereof may be used in our procedure. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and hence the ultimate hardness of a vinyl polymer can be increased by utilization during polymerization of a small amount of an unsaturated compound containing at least two terminal vinyl groups each linked to a carbon atom in a straight chain or in a ring. These compounds serve to cross-link the polyvinyl chains and are generally designated as cross-linking agents. Such agents are described, for example, by Kropa and Bradley in vol. 31, No. 12, of "Industrial and Engineering Chemistry," 1939. Among such cross-linking agents for our purpose may be mentioned N,N'-methylene-bis-acrylamide, triallyl cyanurate, divinyl benzene, divinyl ketones and diglycol-diacrylate.

The cross-linking agent is generally employed in an amount ranging from 10 to 50 parts of monomer to each part of the cross-linking agent. It is understood that the greater the quantity of cross-linking agent within such range, the harder the polymer obtained.

Bulk polymerization is usually carried out in a water or organic solvent solution of the monomer. The metal oxides should be dispersed in the solvent solution of the monomer and if the solution be aqueous, it is recommended that a dispersing agent be employed such as those described in application Serial No. 715,528. This will operate to prevent to a large extent the settling out of the metal oxide. If an organic solvent system is used, provisions must be made for the presence in the system of a small quantity of water, say about .1 to 5% by weight. The water may be added as such or may be supplied by incorporating in the reaction mixture a humectant such as ethylene glycol, glycerin or the like. When these substances are present, say in an amount of a few percent by weight of the mixture, they absorb water from the atmosphere to permit photopolymerization to proceed.

Coatings are prepared by dispersing the oxide in a colloidal carrier along with the monomeric compound and the promoter for the oxide if such be used. To facilitate coating, dispersing agents such as saponin or those mentioned in application Serial No. 715,528 may be utilized. A humectant such as glycerin or glycol is preferably added.

It has been explained that optical sensitization of the zinc oxide or titanium dioxide involves a mechanism distinct from that described in the prior art such as Oster, Journal of Photographic Engineering, 1953. Thus, it is considered that the sensitizing dyes are photo-oxidized rather than photoreduced. This is pointed up by the following experiment:

Two dyes—erythrosin and methylene blue—were irradiated in the presence and absence of titanium dioxide with light of a wave length of 365 m$\mu$ which is absorbed by the oxide but not by the dye. Ultraviolet and visible spectra were obtained from these samples as well as of the oxidized and reduced (leuco) forms of the dyes. The spectra indicated that extensive photobleaching of the dyes occurred only in the presence but not in the absence of titanium dioxide. Furthermore, there was no evidence that the leuco forms of the dyes were produced. Finally, the bleached samples of the dyes were not restored to their original color by oxidizing agents.

We conclude, therefore, that irradiation with light of zinc oxide or titanium dioxide sensitized with the involved dyes leads to irreversible oxidation. This mechanism indicates that our system is not predicated on photoreduction but rather on photo-oxidation.

The invention will be illustrated by the following examples but it is to be understood that the invention is not restricted thereto.

*Example I*

The following composition was prepared:

| | G. |
|---|---|
| Acrylamide | 180 |
| N,N'-methylene-bis-acrylamide | 7 |
| Water | 120 |

To 6 cc. of this mixture were added about 100 mg. of zinc oxide. The mixture confined in a test tube was exposed to the light of a 150 watt tungsten lamp at a distance of 6". Photopolymerization to a solid mass ensued in a period of 17 minutes.

*Example II*

To the mixture of Example I there were added 4 drops of a .1% aqueous solution of Rose Bengal. Upon irradiation of the mixture under the conditions of Example I, photopolymerization to a solid mass ensued in a period of 8½ minutes. The dye was essentially decolorized or bleached.

*Example III*

To 5 cc. of the composition of Example I were added 25 mg. of zinc oxide. The mixture was confined in a test tube and exposed to the light of a 150 watt tungsten lamp at a distance of 6". Photopolymerization ensued in a period of 13½ minutes.

*Example IV*

To 5 cc. of the composition of Example I were added 25 mg. of titanium dioxide and the mixture irradiated as in Example III. Photopolymerization ensued in a period of 19 minutes.

*Example V*

The following composition was prepared and will hereinafter be referred to as W-5:

| | G. |
|---|---|
| Acrylamide | 180 |
| N,N'-methylene-bis-acrylamide | 7 |
| Water | 120 |

Coatings were prepared on a hardened gelatin layer on film using the following formulation:

| | |
|---|---|
| 10% gelatin | 450 ml. |
| Titanium dioxide | 60 g. in 60 ml. of water. |
| W-5 | 90 ml. |
| Saponin 8% | 7.2 ml. |
| Glycerin | 3 ml. |

To 2.5 g. of the suspension were added before coating 5 ml. of a solution containing the quantities of promoter as indicated below. Each 30 g. of the coating suspension or "solution" contained 2.5 g. of oxide. The ratio R represents the weight of cation to the weight of oxide. For example, R=1 to 5 means that there is .5 g. of cation for each 2.5 g. of titanium dioxide. A number of coatings were prepared and exposed for different time intervals to a tungsten lamp (375 watt) at 30". The speeds indicate the minimum amount of time required to obtain a sharp relief image. The relief was obtained by washing away the unpolymerized parts of the emulsion.

| | |
|---|---|
| Promoter | thallous nitrate |
| Ratio of cation to titanium dioxide | 1 to 10 |
| Time of photopolymerization | 2½ minutes |

A similar coating omitting the thallous nitrate required 15 minutes to obtain the sharp relief image by photopolymerization.

Example VI

The procedure was the same as in Example V excepting that the ratio of cation to titanium dioxide was 1 to 25. In this case, photopolymerization required 5 minutes.

Example VII

The procedure was the same as in Example V excepting that the ratio of cation to titanium dioxide was 1 to 100. In this case, photopolymerization to produce the sharp relief image required 10 minutes.

Example VIII

The procedure was the same as in Example V excepting that the thallous nitrate was replaced by thallous sulfate and the ratio of cation to titanium dioxide was 1 to 10. Photopolymerization to produce the desired relief image required 5 minutes.

Example IX

The procedure was the same as in Example V excepting that the thallous nitrate was replaced by thallous formate and the ratio of the cation to the oxide was 1 to 5. Photopolymerization required 5 to 10 seconds.

In the same system while eliminating the oxide, photopolymerization required more than 15 minutes.

Example X

The procedure was the same as in Example IX excepting that the ratio of cation to the oxide was 1 to 10. Photopolymerization required only 10 seconds.

Example XI

The procedure was the same as in Example IX excepting that the ratio of cation to the oxide was 1 to 25. Photopolymerization to produce the desired relief image required 30 seconds.

Example XII

The procedure was the same as in Example V excepting that the titanium dioxide was replaced by zinc oxide (2.5 g.) and the thallous nitrate by thallous oxalate and the ratio of the cation to the oxide was 1 to 33. Photopolymerization to the desired relief image required 10 minutes.

Example XIII

The procedure was the same as in Example XII excepting that the zinc oxide was replaced by titanium dioxide and the ratio of the cation to the oxide was 1 to 65. Photopolymerization required 2½ minutes.

Example XIV

The procedure was the same as in Example V excepting that the thallous nitrate was omitted. Photopolymerization ensued in a period of 15 minutes.

Example XV

The procedure was the same as in Example V excepting that the titanium dioxide was replaced by 2.5 g. of zinc oxide and the thallous nitrate was omitted. Photopolymerization to the desired relief image required 15 minutes.

Example XVI

The procedure was the same as in Example V excepting that the thallous nitrate was replaced by ferric chloride and the ratio of cation to oxide was 1 to 200. Photopolymerization to the desired relief image required 1¼ minutes.

In the same system without the oxide, photopolymerization required more than 10 minutes.

Example XVII

The procedure was the same as in Example V excepting that the thallous nitrate was replaced by ferric chloride and the ratio of cation to oxide was 1 to 500. Photopolymerization to the desired relief image required 30 seconds.

Example XVIII

The procedure was the same as in Example V excepting that the thallous nitrate was replaced by ferric oxalate and the ratio of cation to the oxide was 1 to 500. Photopolymerization required 38 seconds.

Example XIX

The procedure was the same as in Example XVIII excepting that the ratio of cation to the oxide was 1 to 1000. Photopolymerization to the desired relief image required 20 seconds.

Example XX

The procedure was the same as in Example XVIII excepting that the ratio of cation to oxide was 1 to 2000. Photopolymerization ensued in a period of 38 seconds.

Example XXI

The procedure was the same as in Example V excepting that the titanium dioxide was replaced by zinc oxide and the thallous nitrate by ferric oxalate, the ratio of cation to the oxide being 1 to 1000. Photopolymerization to the desired image required 30 seconds.

Example XXII

The procedure was the same as in Example V excepting that the thallous nitrate was replaced by mercuric acetate and the ratio of cation to the oxide was 1 to 5. Photopolymerization required 5 to 10 seconds.

In the same system without the titanium dioxide, photopolymerization required more than 15 minutes.

Example XXIII

The procedure was the same as in Example XXII excepting that the ratio of cation to oxide was 1 to 10. Photopolymerization required 10 seconds.

Example XXIV

The procedure was the same as in Example V excepting that the titanium dioxide was replaced by zinc oxide, the thallous nitrate by mercuric acetate and the ratio of cation to oxide is 1 to 5. Photopolymerization ensued in 5 minutes.

In the same system while omitting the oxide, photopolymerization required more than 15 minutes.

Example XXV

The procedure was the same as in Example V excepting that there were added to the solution before coating 10 millimols of sodium formate and the thallous nitrate was omitted. Photopolymerization required 10 seconds.

With a concentration of sodium formate of 2.5 millimols and the same quantity of titanium dioxide used in Example V, i.e., 2.5 g. per 30 g. of coating solution, photopolymerization required 15 seconds.

By reducing the concentration of sodium formate to 1.2 millimols, photopolymerization ensued in 2½ minutes.

Example XXVI

The procedure was the same as in Example V excepting that the titanium dioxide was replaced by 2½ g. of zinc oxide per 30 g. of coating solution and the thallous nitrate was replaced by 10 millimols of sodium formate. Photopolymerization to the desired relief image required 10 seconds.

Example XXVII

The procedure was the same as in Example V excepting that the thallous nitrate was replaced by 1.2 millimols of sodium oxalate, the same quantity of titanium dioxide being employed. Photopolymerization required 2½ minutes.

Example XXVIII

The procedure was the same as in Example V excepting that the titanium dioxide was replaced by 2.5 g. of zinc oxide and the thallous nitrate was replaced by 1.2 milimols of sodium oxalate. Photopolymerization required 5 minutes.

Example XXIX

The procedure was the same as in Example V excepting that the ratio of cation to the oxide was 1 to 20 and there were added prior to coating 10 millimols of sodium formate. Photopolymerization ensued in 10 seconds.

Example XXX

The procedure was the same as in Example V excepting that the thallous nitrate was replaced by 5 mg. of Rose Bengal per 30 g. of the coating solution. Photopolymerization required 2½ seconds.

Example XXXI

The procedure was the same as in Example XXX excepting that the Rose Bengal was replaced with the same amount of methylene blue. Photopolymerization required 15 seconds.

Example XXXII

The procedure was the same as in Example XXX excepting that the Rose Bengal was replaced by the same amount of eosin. Photopolymerization required 2½ seconds.

Example XXXIII

The procedure was the same as in Example V excepting that the titanium dioxide was replaced by 5 g. of zinc oxide and the thallous nitrate by 5 mg. of Rose Bengal. Photopolymerization required 5 seconds.

The same results were obtained when replacing Rose Bengal by methylene blue and by erythrosin.

Example XXXIV

A composition was prepared as follows:

Acrylic acid _____ ml__ 5
Zinc oxide _____ mg__ 25

By irradiating this composition confined in a test tube as in Example I, photopolymerization occured in a matter of minutes.

Example XXXV

The procedure was the same as in Example XXXIV excepting that the zinc oxide was replaced by the same amount of titanium dioxide. The results were similar to those of Example XXXIV.

Example XXXVI

The procedure was the same as in Example XXXIV excepting that the acrylic acid was replaced by 2 ml. of a 20% aqueous solution of calcium acrylate. Photopolymerization ensued in a matter of seconds.

Example XXXVII

The procedure was the same as in Example V excepting that the acrylamide was replaced by calcium acrylate. The results were similar to those obtained in Example V.

Example XXXVIII 10 g. of N-tertiary-butyl acrylamide were dissolved in 30 g. of a 10% aqueous solution of ethyl cellulose and toluene.

1 g. of a dispersing agent—lauryl sulfate—was added and in this oily solution 4 to 5 g. of zinc oxide were dispersed. The solution was placed in a reactor and exposed using the technique of Example I. Photopolymerization occurred in a matter of minutes yielding a solid hydrophobic polymer.

Example XXXIX

A composition was prepared from the following components:

Acrylamide _____ g__ 180
N,N'-methylene-bis-acrylamide _____ g__ 7
Water _____ cc__ 120
Zinc oxide _____ g__ .02

To 1 cc. of this composition there were added 1 cc. of a 10% dispersion of vinyl acetate and 1 cc. of an aqueous solution containing 2.5 mg. of ferric oxalate. Irradiation of this composition to the light of a 500 watt tungsten lamp at a distance of 5" caused photopolymerization to ensue in a period of a few minutes.

Example XL

A composition was prepared from the following components:

Acrylamide _____ g__ 180
N,N'-methylene-bis-acrylamide _____ g__ 7
Water _____ cc__ 120

To 6 cc. of this solution were added 1 g. of acrylonitrile, .02 g. of zinc oxide and 25 mg. of thallous oxalate. By irradiating the composition at a distance of 6" from the light source while utilizing a 500 watt tungsten lamp, rapid photopolymerization occurred.

Example XLI 1 g. of vinyl acetate was dispersed in water to produce a 1% dispersion. To this composition were added .02 g. of zinc oxide and 3.6 mg. of ferric chloride. By irradiating the composition with the light source of Example XL at a distance of 5", photopolymerization occurred in a matter of minutes.

Example XLII

The following composition was prepared:

|   | G. |
|---|---|
| Methacrylamide | 50 |
| N,N'-methylene-bis-acrylamide | 4 |
| Water | 7 |

To this composition there were added .02 g. of titanium dioxide and 25 mg. of thallous nitrate.

The composition was irradiated with a 150 watt tungsten lamp at a distance of 6". The mass polymerized after an exposure of a few minutes.

Example XLIII 5 g. of styrene were dissolved in 2.5 g. of a 10% solution of ethyl cellulose and toluene. After the addition of 3 drops of a 25% solution of lauryl sulfate, .02 g. of titanium dioxide and 25 mg. of mercuric acetate were dispersed with the aid of a Waring Blendor. The composition was placed in a reactor and exposed while using the technique of Example XL. Photopolymerization occurred in a matter of minutes yielding a solid hydrophobic polymer.

Modifications of the invention will occur to persons skilled in the art. Thus, in lieu of any of the monomers mentioned in the examples, we may use any of the vinyl monomers mentioned above. Similarly, catalytic systems other than those of the examples using the combinations specified may be employed. We, therefore, do not intend to be limited in the patent granted except as necessitated by the appended claims.

We claim:

1. Light-sensitive photographic material comprising a base coated with a colloidal carrier containing a normally liquid to solid dispersible monomer containing the grouping $CH_2=C=$ and a white light-sensitive catalyst capable of inducing photopolymerization of said monomer and selected from the class consisting of zinc oxide and titanium dioxide in admixture with a compound selected from the class consisting of a salt having a cation selected from the class consisting of mercuric, thallous and ferric, said catalyst being the sole catalyst present in said carrier.

2. The light-sensitive photographic material of claim 1 wherein the catalyst is zinc oxide in admixture with a compound selected from the class consisting of a salt having a cation selected from the class consisting of mercuric, thallous and ferric.

3. The light-sensitive photographic material of claim 1 wherein the catalyst is titanium dioxide in admixture with a compound selected from the class consisting of a salt having a cation selected from the class consisting of mercuric, thallous and ferric.

4. The light-sensitive photographic material of claim 1 wherein the catalyst is a mixture of titanium dioxide and a mercuric salt.

5. The light-sensitive photographic material of claim 1 wherein the catalyst is a mixture of zinc oxide and a thallous salt.

6. The light-sensitive photographic material of claim 1 wherein the catalyst is titanium dioxide and a ferric salt.

7. The process of producing high molecular weight, solid polymers from monomeric vinyl compounds which comprises subjecting a normally liquid to solid monomer having the grouping $CH_2=C=$ to photopolymerization by exposing the monomer to a light source ranging in length from those of the U. V. to the visible spectrum in the presence of a metal oxide capable of inducing photopolymerization of said monomer and selected from the class consisting of zinc oxide and titanium dioxide in admixture with a compound selected from the class consisting of a salt having a cation selected from the class consisting of mercuric, thallous and ferric, said catalyst being the sole catalyst present in said carrier.

8. The process as defined in claim 7 in which the catalyst is zinc oxide in admixture with a compound selected from the class consisting of a salt having a cation selected from the class consisting of mercuric, thallous and ferric.

9. The process as defined in claim 7 in which the catalyst is titanium dioxide in admixture with a compound selected from the class consisting of a salt having a cation selected from the class consisting of mercuric, thallous and ferric.

10. The process as defined in claim 7 in which the catalyst is a mixture of titanium dioxide and a mercuric salt.

11. The process as defined in claim 7 in which the catalyst is a mixture of zinc oxide and a thallous salt.

12. The process as defined in claim 7 in which the catalyst is a mixture of titanium dioxide and a ferric salt.

13. A printing plate comprising a base coated with a light-sensitive photographic emulsion comprising a colloidal carrier containing a normally liquid to solid monomer having the grouping $CH_2=C=$ and a light-sensitive catalyst capable of inducing photopolymerization of said monomer and selected from the class consisting of zinc oxide and titanium dioxide in admixture with a compound selected from the class consisting of a salt having a cation selected from the class consisting of mercuric, thallous and ferric, said catalyst being the sole catalyst present in said carrier.

References Cited in the file of this patent

UNITED STATES PATENTS

| | | |
|---|---|---|
| 2,367,660 | Agre | Jan. 23, 1945 |
| 2,367,661 | Agre | Jan. 23, 1945 |
| 2,413,973 | Howk et al. | Jan. 7, 1947 |
| 2,435,429 | Evans et al. | Feb. 3, 1948 |
| 2,480,749 | Marks | Aug. 30, 1949 |
| 2,491,409 | Kropa et al. | Dec. 13, 1949 |
| 2,500,023 | Burk | Mar. 7, 1950 |
| 2,924,561 | Schmerling | Feb. 9, 1960 |
| 2,947,716 | Cornell et al. | Aug. 2, 1960 |

UNITED STATES PATENT OFFICE
CERTIFICATE OF CORRECTION

Patent No. 3,041,172                                                   June 26, 1962

Helene D. Evans et al.

It is hereby certified that error appears in the above numbered patent requiring correction and that the said Letters Patent should read as corrected below.

Column 4, line 59, for "2.5 g." read -- 25 g. --.

Signed and sealed this 23rd day of October 1962.

(SEAL)
Attest:

RNEST W. SWIDER                                               DAVID L. LADD
Attesting Officer                                             Commissioner of Patents